Patented Mar. 16, 1937

2,073,938

UNITED STATES PATENT OFFICE 2,073,938

SOLVENT AND PLASTICIZING COMPOSITION

Lucas P. Kyrides, Webster Groves, Mo., assignor, by mesne assignments, to Monsanto Chemical Company, a corporation of Delaware No Drawing. Application December 27, 1932, Serial No. 648,986

17 Claims. (Cl. 106—37)

This invention relates to a novel class of high boiling solvents or plasticizers for cellulose esters, cellulose ethers, natural resins, as well as synthetic resins, the present application being a continuation in part of my co-pending application Serial Number 618,305, filed June 20, 1932.

In my co-pending application I have disclosed and claimed a novel class of ester compositions characterized in that they embody esters of oxy acetic acid or its homologues. This invention relates specifically to the utilization of compositions, which compositions are in general of the same generic class as those disclosed in the aforementioned application, in the manufacture of films, lacquers, varnishes, threads, molding compositions, impregnating compositions, etc., for the purpose of imparting desirable characteristics to the ultimate product.

The ester compositions disclosed herein as plasticizers or high boiling solvents are high boiling liquids or low melting solids which are permanently monomeric, non-resinifiable and non-polymerizable. In this respect they are distinguishable from the vinyl type ester compositions which do polymerize and resinify. These new plasticizers are relatively non-volatile at ordinary temperatures and impart a degree of plasticity, flexibility and resistance to fracture, to the ultimate product as may be desired. An outstanding characteristic of the class of compositions contemplated by the present invention resides in their inordinate degree of compatibility not only with cellulose derivatives but also with a large variety of synthetic and natural resins.

In general the novel class of compositions, the use of which is herein contemplated, consists of neutral esters of carboxylic acids containing one oxy (hydroxy) acetic acid ester group or ester homologues of oxy acetic acid, including glycollic acid, lactic acid, beta oxy propionic acid, alpha and beta oxy butyric acid, etc. These ester compositions may take a form in which an ether group is present, as, for example, in the case of neutral esters of diglycollic acid or preferably they may take the form in which the oxy group is esterified with an acid group as in the case of the ethyl glycollate ester of a mono carboxylic aliphatic or aromatic acid such as benzoic acid. Another example of compositions which has been found to have inordinate solvent properties is the neutral mono glycollate derivatives of discarboxylic acids, such, for example, as the ethyl glycollate ester of the mono ethyl ester of phthalic acid which may be represented structurally as follows:

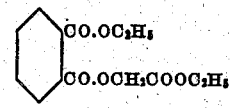

The alcohols which may be employed in preparing the esters may be alkyl or aralkyl alcohols, including cyclic alcohols, as well as an aryl alcohol (phenols) or ether substituted alkyl alcohols such as the mono alkyl ether of glycol, an example of which is the mono ethyl ether of ethylene glycol. In lieu of the phthalic acid one may substitute other dicarboxylic acids, such as chlorphthalic acid, succinic acid, adipic acid, diglycollic acid, thiodiglycollic acid or their anhydrides.

The following example will serve to illustrate the preparation of compositions, the use of which is contemplated herein, to wit: the ethyl glycollate ester of the mono ethyl ester of phthalic acid, it being understood that the invention is not limited to any specific method of preparing the plasticizing compositions.

The mono sodium salt of ethyl phthalate is first prepared by refluxing rapidly, preferably with mechanical agitation, 400 kilos of phthalic anhydride and 880 liters of absolute ethyl alcohol. The mixture is then allowed to cool to approximately 50° C., after which 159 kilos of anhydrous sodium carbonate are added slowly in order to avoid violent interaction. The resulting mixture is then heated, preferably with agitation, to assure the completion of the reaction. Thereafter 367.5 kilos of ethyl chloracetate (ethyl ester of chlor acetic acid) are added slowly while the mixture is agitated and maintained at the temperature of a steam bath, or preferably at the refluxing temperature.

The resulting reaction mixture is filtered from the sodium chloride which is washed with alcohol. The alcohol is recovered by distillation and the residual oil is steam distilled for three hours at approximately 100° C. The product so obtained is washed with a sodium carbonate solution until the solution is faintly alkaline to phenolphthalein. If desired the ester may be treated with decolorizing charcoal in the usual manner. For this purpose 1% of Darco, based on the weight of the oil product, is uniformly distributed therein after which the mixture is maintained at 90° C. for approximately one hour before removing the carbon by filtration.

The reaction may be represented as follows:

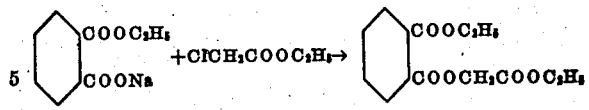

The product boils at 223–224° C. at 24 millimeters without decomposition. It crystallizes at approximately 20° C.

In lieu of the chloracetate ester one may employ an ester of the lower mono chlor substituted fatty acids such as chlor propionic acid or a chlor butyric acid.

Obviously, in lieu of the ethyl sodium phthalate employed in the foregoing example, one may prepare the corresponding methyl, propyl, butyl, benzyl, as well as phenyl sodium phthalate. Similarly, in lieu of the ethyl ester of chlor acetic acid, one may substitute the chlor acetic acid ester of cresol, phenol or of methyl, propyl, butyl, amyl, or benzyl alcohol, as well as of mono alkyl ether esters of glycol such as the mono ethyl ether ester of ethylene glycol and the dialkyl ether ester of glycerol, etc. The esters of chloracetic acid may be replaced by the esters of other chlor fatty acids such as the alpha or beta chlor propionic acid esters or mixtures thereof.

Heretofore a variety of esterlike compositions have been employed to impart desirable characteristics to plastics, including the thermo-setting plastics. Thus, for example, dibutyl phthalate has been used extensively in the manufacture of cellulose nitrate products, particularly cellulose nitrate lacquers. However, dibutyl phthalate is not employed in the manufacture of cellulose acetate plastics by reason of its restrictive compatibility. On the other hand, dimethyl phthalate has been used extensively in the manufacture of cellulose acetate since this material has a substantially greater degree of compatibility as compared to dibutyl phthalate.

Tricresyl phosphate is used extensively in the manufacture of nitro cellulose compositions but is unsatisfactory in the manufacture of cellulose acetate compositions because of its negligible compatibility therewith. On the other hand, triphenyl phosphate is used extensively in the manufacture of cellulose acetate compositions since it possesses a relatively marked degree of retentivity as compared to tricresyl phosphate. In the case of synthetic resins, which are of varied chemical composition, no single class of high boiling solvents or plasticizers has been found suitable. This is not surprising in view of the varied nature of synthetic resins which include styrol polymerization products, phenol formaldehyde condensation products, vinyl esters such as the vinyl chloride and vinyl acetate condensation products, alkyd resins which are reaction products of polyhydric alcohol and poly basic acids or mixtures of poly and mono basic acids et al. In view of the varied nature of these resinous compositions it is wholly unexpected that the class of compositions contemplated herein is compatible and capable of imparting thereto desirable flexibility, plasticity and resistance to fracture. The following examples serve to illustrate the application of the principles of my invention.

*Example I.*—A nitrocellulose film may be made conveniently by forming a solution of cellulose nitrate in a solvent which may contain the following ratio of ingredients:

25% active solvent such as ethyl acetate, butyl acetate, etc.

20% alcohol such as denatured alcohol, butyl alcohol, etc.
55% hydrocarbon such as benzol, toluol etc.

Thereafter there is added an equal quantity by weight of the ethyl glycollate ester of mono ethyl phthalic acid which may be made in the manner described above. A uniform solution is effected by agitation in the usual manner after which a film may be formed by spreading the mixture over a smooth surface and permitting the low boiling solvents to volatilize. Upon exposure of the resulting film to ultra violet light no evidence of discoloration will be observed even after an inordinately long period of exposure.

*Example II.*—A cellulose acetate film may be made in an analogous manner by substituting acetone for the low boiling solvent mixture and otherwise proceeding as above.

*Example III.*—Substitute an equal weight of the diethyl ester of diglycollic acid in lieu of the ethyl glycollate ester of mono ethyl phthalic acid provided in Example I.

*Example IV.*—In lieu of the diethyl ester of diglycollic acid prescribed in the foregoing example, substitute an equal amount by weight of the ethyl glycollate ester of the mono ethyl ester of succinic acid or of diglycollic acid.

*Example V.*—A phenol aldehyde condensation product which has been condensed or polymerized insufficiently to render it insoluble in alcohol is dissolved in alcohol, preferably to produce a 50% by weight solution. To 40 grams of such a solution add 6 grams of the methyl glycollate ester of mono ethyl phthalic acid (30% of the weight of the resin). After mixing thoroughly to obtain a homogeneous solution, the alcohol is removed by distillation or evaporation. The resulting product is flexible whereas the unplasticized resin is very brittle. More or less than 30% of the plasticizer can be employed depending upon the degree of flexibility desired in the final product. If desired, the final product may be baked or otherwise treated as is well understood by those skilled in the art.

The use of a solvent may be dispensed with in the foregoing example by incorporating the ester in the resin while in a fluxed or fluid condition.

*Example VI.*—An alkyl resin prepared by condensing phthalic anhydride with glycerol containing a relatively small amount of glycol whereby a soluble thermo-plastic resin is obtained, is mixed while in a molten condition with from 5 to 50% of the plasticizers contemplated herein, as, for example, those specifically designated in the foregoing examples. A uniform mixture is thus obtained which may be employed in the manufacture of varnishes, lacquers, or molding compositions in a manner understood by those skilled in the art.

*Example VII.*—A polymerized styrol resin is dissolved in a suitable solvent, such as acetone, after which there is incorporated from 10 to 20% by weight of the ethyl glycollate ester of the mono butyl ester of phthalic acid. The solvent is then eliminated in the usual manner. Ten percent by weight of the plasticizer imparts a fair degree of plasticity whereas twenty percent by weight gives a very flexible resin. More than twenty percent may be added if desired.

*Example VIII.*—A vinyl ester resin such, for example, as polymerized vinyl acetate is pulverized after which from 2 to 20% of the ethyl glycollate ester of mono ethyl ester of phthalic acid is sprayed on the powder. After standing for a few hours the plasticizer will have penetrated the resin completely and the product may be molded in any desirable form in the usual manner. Two percent of the plasticizer will impart a marked degree of plasticity to the resin although in most cases it is desirable to add from 5 to 20% of the plasticizer.

One may incorporate the plasticizer in a solution of the vinyl compound if so desired.

From the foregoing description it will be apparent that the present invention contemplates a class of organic compositions which possess inordinate solvent properties for plastic materials of a varied class including the cellulose esters and ethers, styrol resins, vinyl ester condensation products, alkyd resins, phenolic aldehydic condensation products, and so forth.

Inasmuch as the compositions are relatively non-volatile at ordinary temperatures they are capable of imparting plastic desirable properties to the final product for a prolonged period of time.

Although I have described a number of embodiments of the invention and have indicated numerable modifications, it will be apparent that the invention is susceptible to many other variations without departing from the spirit thereof.

Attention is drawn to my copending applications, Serial Number 119,756, filed January 9, 1937 and Serial Number 119,757, filed January 9, 1937, pertaining to divisional matter disclosed but not claimed in this application.

What I claim is:

1. An organic plastic composition comprising one of the following: cellulose esters, cellulose ethers, alkyd resins, phenolic-aldehyde resins, styrol resins and polymerized vinyl esters, which composition is admixed with a plasticizer characterized in that it is a neutral ester of a monoalkyl ester of a dicarboxylic acid of the group consisting of phthalic acid, chlorphthalic acid, succinic acid, adipic acid and diglycollic acid, the other carboxyl group of the dicarboxylic acid being esterified by one of the following: an oxy acetic alkyl ester, an oxy propionic alkyl ester, and an oxy butyric alkyl ester wherein each of said alkly groups is saturated.

2. An organic plastic composition comprising one of the following: cellulose esters, cellulose ethers, alkyd resins, phenolic-aldehyde resins, styrol resins and polymerized vinyl esters, which composition is admixed with a plasticizer characterized in that it is a neutral ester of a monoalkyl ester of phthalic acid, the other carboxyl group of the phthalic acid being esterified by one of the following: an oxy acetic alkyl ester, an oxy propionic alkyl ester, and an oxy butyric alkyl ester wherein each of the alkyl groups is saturated.

3. A cellulosic plastic containing as a plasticizer a material having the following structural formula:

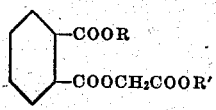

wherein OR and OR' are alcohol residues of saturated aliphatic alcohols.

4. A cellulose ester plastic containing as a plasticizer material having the following structural formula:

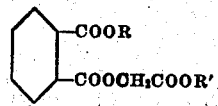

wherein OR and OR' are alcohol residues of saturated aliphatic alcohols.

5. A cellulose ester plastic containing a cellulose ester and as a plasticizer therefor a material having the following structural formula:

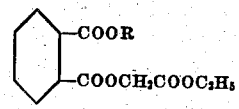

wherein OR is a saturated alkyl alcohol residue.

6. A cellulosic plastic composition containing a plasticizer having the following structural formula:

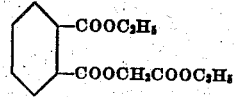

7. A composition of matter comprising an organic plastic substance having a plurality of C—O—C linkages of the class consisting of resins and cellulose derivatives, and as a plasticizer therefor, a neutral ester of the formula:

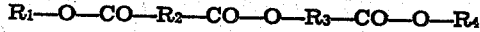

wherein $R_1$ and $R_4$ are monovalent radicals derived from saturated monohydric alcohols, $R_2$ is a divalent hydrocarbon radical, and $R_3$ is a divalent aliphatic hydrocarbon radical.

8. A composition of matter comprising a cellulose derivative and as a plasticizer therefor, a neutral alkyl ester of phthalymonoglycolic acid said alkyl groups being saturated.

9. A cellulose acetate composition containing a plasticizer characterized in that it is a neutral ester having the following structural formula:

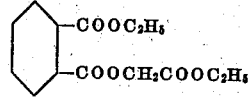

10. A composition of matter comprising a cellulosic plastic and as a plasticizer therefor a neutral alkyl ester of phthalyl mono-glycollic acid the alkyl groups being saturated.

11. An organic plastic composition comprising one of the following: cellulose esters, cellulose ethers, alkyl resins, phenolaldehyde resins, styrol resins and polymerized vinyl esters which composition contains a plasticizer characterized in that it is a neutral ester of the following formula: $R_1$—O—CO—$R_2$—CO—O—$R_3$—CO—O—$R_4$ wherein $R_1$ and $R_4$ are monovalent saturated alkyl radicals derived from saturated monohydric alcohols, $R_2$ is a divalent hydrocarbon radical, and $R_3$ is a divalent aliphatic hydrocarbon radical.

12. A composition as defined in claim 11 and further characterized in that $R_2$ is the phenylene hydrocarbon radical.

13. A composition of matter comprising a cellulose derivative and as a plasticizer therefor an ester having the formula:

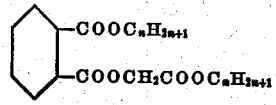

14. A cellulosic plastic composition containing a plasticizer characterized in that it is a permanently monomeric, non-polymerizable material having the following structural formula:

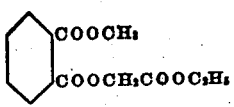

15. A cellulosic plastic composition containing a plasticizer characterized in that it is a permanently monomeric, non-polymerizable material having the following structural formula:

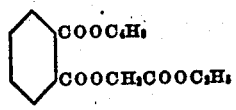

16. A cellulose nitrate composition containing a plasticizer characterized in that it is a permanently monomeric, non-polymerizable material having the following structural formula:

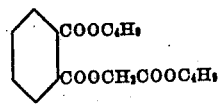

17. A cellulose acetate composition containing a plasticizer characterized in that it is a permanently monomeric, non-polymerizable material having the following structural formula:

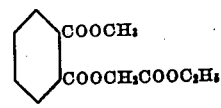

LUCAS P. KYRIDES.